Sept. 6, 1932. V. F. ZAHODIAKIN 1,876,160
INTERNAL COMBUSTION ENGINE VALVE
Filed Nov. 16, 1931 3 Sheets-Sheet 2

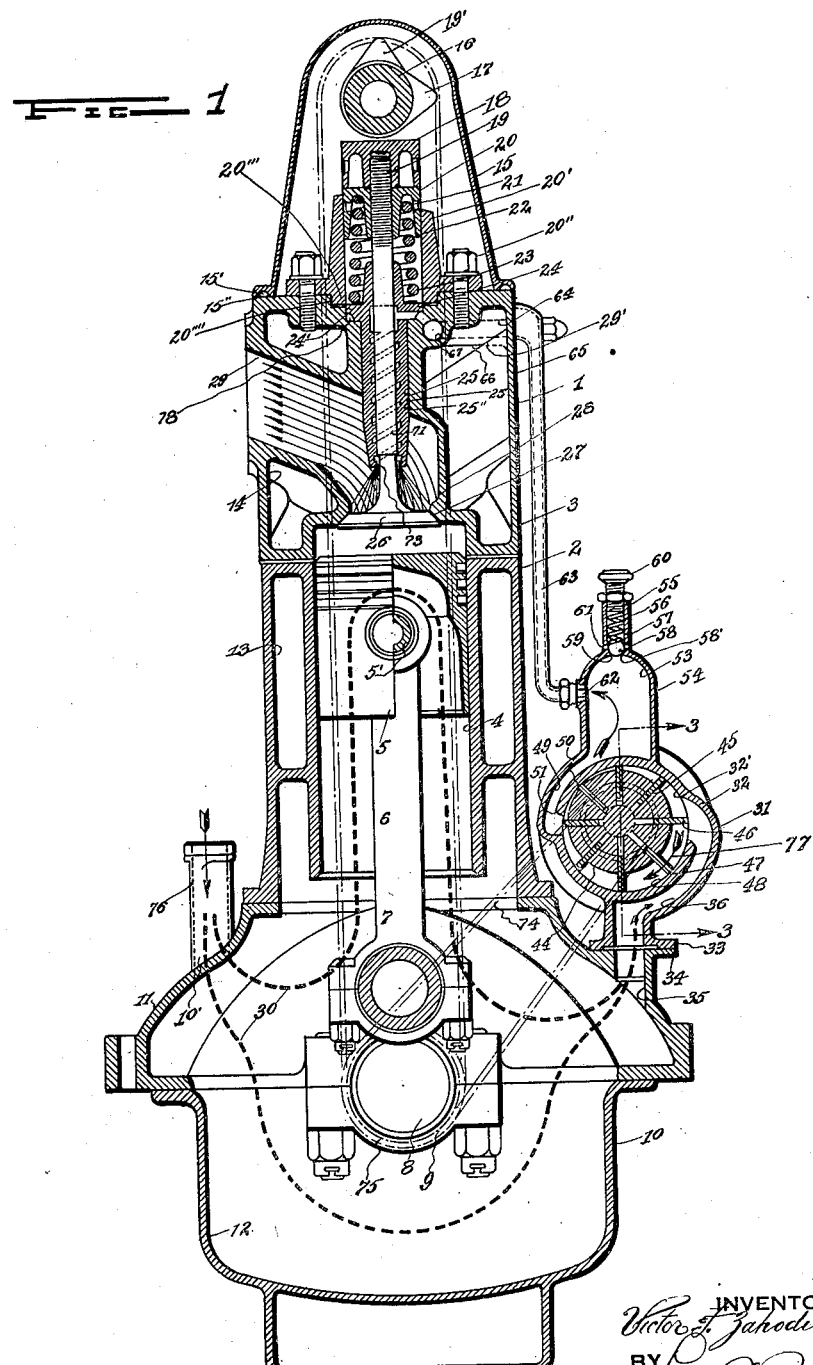

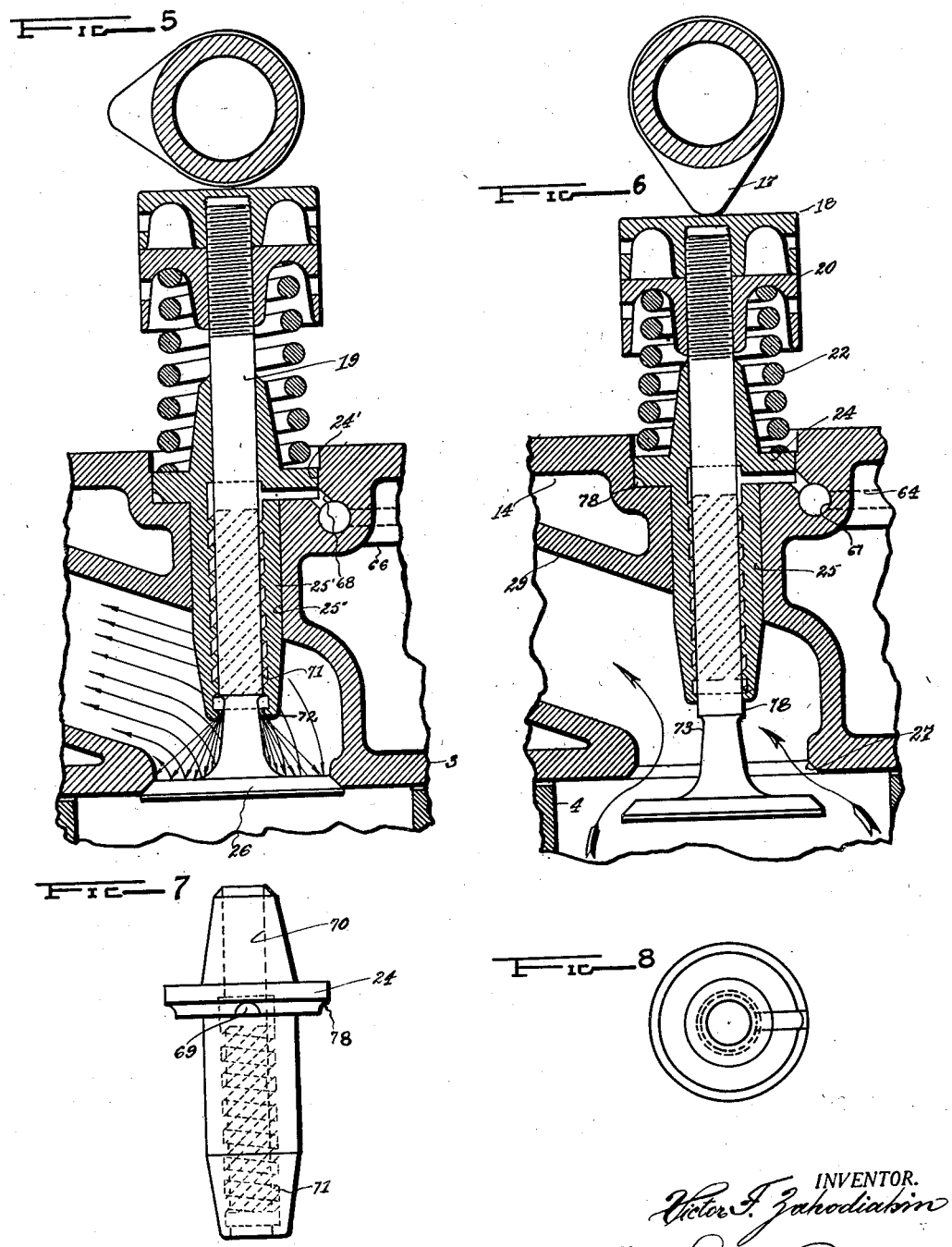

Patented Sept. 6, 1932

1,876,160

UNITED STATES PATENT OFFICE

VICTOR F. ZAHODIAKIN, OF CINCINNATI, OHIO

INTERNAL COMBUSTION ENGINE VALVE

Application filed November 16, 1931. Serial No. 575,259.

The invention relates to internal combustion engine valves.

Heretofore, in internal combustion engines, employing poppet valves for the respective cylinders, the excessive heat of the exploded gases within the cylinders, during the explosion stroke, results in considerable heat being transmitted to the exhaust valve heads and their stems and seats, because all of the hot gases developed from the exploded fuel pass through the exhaust valves, which are located in the cylinder head and have no ventilating means. Therefore, the valve heads and their seats soon become pitted. Moreover, this excessive heat facilitates in the collection and accumulation of carbon deposits on the valves, their stems and in the valve guides. Moreover, normal power capable of being developed by the usual internal combustion engine of this type is importantly reduced as a result of these disadvantages and the small area of the exhaust and intake ports. In addition to these disadvantages of the usual internal combustion engine the fact that the area of the valves is small not only results in the power being materially decreased, but also the engine is adapted to vibrate considerably and its normal speed is importantly reduced.

Therefore, in consideration of these facts the general object of the invention is to improve the general construction of internal combustion engines employing poppet valves so as to effect great simplicity, durability and high efficiency of the engine; to provide means whereby the exhaust valve head, exhaust valve seat and exhaust valve stem are maintained at a low temperature; to provide means whereby the walls and tops of said pistons, the cylinder walls and other operating parts of said engine, and the oil in the crank case of said engine are maintained at low temperatures; to provide means adapted to automatically lubricate the exhaust valve stems; to provide means adapted to render said engine positive of action, relatively silent while operating, durable and effective for the purpose of creating maximum power particularly by providing means adapted to reduce the necessary power required to exhaust the burned gases from within the cylinders; to provide efficient means adapted to reduce to a minimum the vibration of the operating parts of said engine; and to provide means adapted to render said engine to operate dependably and unlikely to require frequent replacements or repairs of the exhaust valves.

Other objects are made apparent by reference to the drawings, and the hereinafter description.

The invention resides in certain novel features, the combination, arrangement of the parts and in the details of the construction, as will be more fully hereinafter described and claimed.

In the drawings:

Fig. 1 is a vertical transverse section taken through the cylinder and exhaust valve of a usual internal combustion engine having the invention incorporated therewith:

Fig. 2 is a plan view of the engine head, showing air passages in dotted lines;

Fig. 3 is a section taken on a line corresponding to 3—3 in Fig. 1;

Fig. 4 is an end view of the rotor with plates removed;

Fig. 5 is a vertical transverse section taken through the exhaust valve of an internal combustion engine shown partly broken away and with the valve in closed position;

Fig. 6 is the same showing the valve in open position;

Fig. 7 is a side elevational view of the exhaust valve stem guide;

Fig. 8 is a bottom view of the same;

Fig. 9 shows a modification of the invention.

In the preferred construction of the invention I provide the internal combustion engine 1 comprising the usual engine block 2 having the engine head 3 suitably fixed thereto. The block 2 is provided with the usual cylinder 4 into which is slidably fitted the usual reciprocating piston 5 having connected thereto the usual connecting rod 6 which has its lower end 7 mounted in the bearings of the crank shaft 8 rotatably mounted in the main bearings 9 of the crank case 10. The crank case, comprising the usual upper casing 11 and the lower casing 12, suitably securing to each other, is suitably secured to the engine block 2 having the usual water jacket 13. The engine head also has the usual water jackets 14.

Fixed to the top of the engine head is the cover 15 having the packing 15' in the groove 15'', in its lower edge, for the purpose of making an air-tight connection between the cover and the head. Within the cover 15 is received the usual rotatable cam shaft 16 having thereon the usual exhaust cam 17, and an intake cam 19'. The cam 17 is adapted to intermittently contact the top of the nut 18 which is threaded to the upper end of the exhaust valve stem 19. Below the nut 18 is screwed onto the stem 19 the spring retainer 20 having fitted therein the upper end 21 of the coil spring 22 having its lower end 23 in contact with the outwardly extending circular flange 24 of the exhaust valve guide 25. The flange 24 and the body 25' of the valve guide is received in the circular groove 24' and hole 25'' in the engine head.

Surrounding the spring 22 is the support 20' fixed to the head as by the bolts 20'' and having its lower boss 20''' received in the circular groove 20''''. The upper end of the support surrounds the spring retainer 20.

The coil spring 22 is adapted to urge the valve stem 19 upwardly thereby, during the intake, compression and explosion strokes of the piston 5, maintaining the exhaust valve head 26, integral with the lower end of the valve stem, with the seat 27 formed in the walls of the port 28 which leads upwardly from the cylinder 4 and communicates with the exhaust passage 29 which leads to the outside of the head 3, and passes through its outer walls.

In operation the cam shaft 16 is, as usual, rotated by means of gear or chain connection with the crank shaft 8 whereby the cam 17 is adapted to contact the nut 18, during the exhaust stroke of the piston 5, for the purpose of permitting escape of gases through the port 28 for the purpose of permitting the exhaust gases to escape through the exhaust passage 29 from the engine head. During the intake, compression and explosion strokes of the piston 5 the cam 17 is inoperative with respect to the nut 18, whereby the coil spring 22 is adapted to urge the valve stem 19 upwardly and maintain the valve head 26 in contact with its seat 27, as shown in Figs. 1 and 5.

The shaft 16 is provided with the usual intake cam 19' which operates the usual intake valve (not shown) for the purpose of permitting entrance of vapor fuel through the intake passage 29'.

For the purpose of providing means whereby air may be caused to circulate through the breather orifice 10' of the crank case 10, through the cylinder 4 and around the wrist pin 5' of the piston 5, as indicated by dotted lines 30, and particularly around the valve stem 19, and in direct contact with the valve head 26, the air pump 31 is provided.

The air pump 31 comprises the casing 32 having the base 33 suitably secured to the boss 34 integral with the upper crank case 11 which has the aperture 35 therein in alignment with and communicating with the passage 36 which leads through the base 33 into the casing of the air pump.

Mounted horizontally in the casing of the air pump is the shaft 37 having its ends 38 and 39 rotatably mounted in the bearings 40 and 41 in the ends 42 and 43 of the casing. Suitably fixed to the shaft 37 is the cylindrical body or rotor 44 having therein equidistant spaced apart radial slots 45 which extend outwardly from the shaft 37.

Slidably fixed in the slots 45 are the plates 46 adapted, when the shaft 37 is rotated, to move outwardly, due to centrifugal force, whereby their outer edges 47 are caused to contact the inner surface of the cylindrical walls 48 which project inwardly of the casing 32 and are parallel with the outer walls of the casing thereby forming the inlet and outlet passages 36 and 49 in the casing 32.

The passages 36 and 49 communicate with the cylindrical compartment 32' within the casing. The shaft 37 is mounted eccentrically of the compartment 32' and is positioned so that the side 50 of the body 44 is adjacent or in close relation with the inner surface of the walls 48 at a point directly above the outlet 51 of the passage 49 which leads into and communicates with the compartment 53 of the pipe 54 integrally formed with the upper portion of the casing 32.

In the upper end of the pipe 54 is the valve 55 which comprises the coil spring 56 mounted in the cylindrical casing 57 integral with the upper end of the pipe 54. In the lower end of the casing 57 is the sphere 58 adapted to be urged by the spring 56, in contact with its seat 58', formed in the top of the pipe, thereby closing the opening 59 which leads from the top of the pipe 54 into the casing 57.

Screwed in the upper end of the casing 57 is the plug 60, the lower end of which the coil spring engages. When the pressure within the pipe 54 exceeds the pressure required to force the sphere 58 upwardly, from contact with its seat, the passage 59 is opened which permits air, or other agency, compressed within the pipe 54, to escape therethrough and out into the atmosphere through the holes 61 which communicate with the passage 59. Manually screwing the plug 60 downwardly increases the pressure required to force the sphere 58 upwardly and open the valve. Manually unscrewing the plug 60 decreases the compression required to force the sphere 58 upwardly to open the valve to permit escape of air, or other agency, within the pipe 54 into the atmosphere.

In the inner side of the pipe 54 is a hole 62 in which is received the lower end of the pipe 63 whose upper end is received in the hole 64 which is in the side 65 of the engine head 3 and passes through the boss 66 of the head. The hole 64 communicates with the hole or orifice 67 which extends longitudinally of the engine head.

Leading from the hole 67 and communicating therewith is a plurality of passages 68 which communicate, respectively, with the openings 69, in the flange 24, which communicate with the vertical openings 70 in the guide into which are fitted the exhaust valve stem 19. The number of passages 68 depends upon the number of cylinders in the engine, as one passage 68 communicates with each exhaust passage 29.

Each passage 68 communicates with the hole 70 through the flange 24, of the valve guide 25, having the central hole or vertical opening 70 therein in which is slidably mounted the valve stem 19.

Formed in the inner surface of the valve guide 25, and communicating with the hole 70 is the screw type depression or groove 71.

When the valve head 26 is in contact with its seat, as shown in Figs. 1 and 5, air is adapted to circulate through the breather 76 and the orifice 10' into the crank case 10, through the hole 35, the pump 31, the pipe 63, the hole 64, the hole 68 and the opening 69. The air then circulates downwardly in the groove 71, which is around the stem 19, through the space 72, between the lower end of the guide 25 and the reduced portion 73 of the stem 19, whereby oil mist within the crank case 10 is adapted to contact the valve stem 19 and lubricate the same. At the same time the air circulates in contact with the valve head 26, the valve stem 19 and the valve guide 25 and results in these parts being maintained at a low temperature.

The operation of the pump 31 is effected by rotation of the drum, or rotor, as by the sprocket chain 74 being geared with the gears, or sprocket wheels, 75 and 76, respectively, fixed to the crank shaft 8 and the horizontal shaft 37. The drum is adapted to rotate in the direction indicated by the arrow 77, whereby air is drawn through the inlet passage 36 by the plates 46 whose outer edges 47 contact the inner surface of the circular walls 48 thereby forcing circulation of the air from the casing through the outlet passage 51 and into the pipe 54.

When the valve head 26 is in open position, caused by contact of the cam 17 with the nut 18, during the exhaust stroke of the piston 5, as shown in Fig. 6, the lower portion 78 of the valve stem, directly above the reduced portion 73, seals the lower portion of the groove 71 thereby preventing air from passing in contact with the valve head 26.

When the spring 22 urges the valve head upwardly in contact with its seat, the air escapes with considerable force from the groove or depression 71 downwardly through the space 72 in contact with the head 26, as shown in Figs. 1 and 5, because while the valve is open the pump 31 is compressing the air within the pipe 54 and other orifices including the groove 71 communicating with the pump.

Irrespective of the position of the valve guide 25 air is adapted to pass from the hole 67 through the hole 70 and into the groove 71, since the lower outer edge of the flange of the valve guide has the groove 78 therein.

Manual operation of the plug 60 permits the operator to adjust or control the flow of air in contact with the valve head, whereby the temperature of the valve head and the valve stem, and adjacent parts, are controlled.

In Fig. 9 is shown a modification of the invention in which the funnel 79 is utilized as a means to force air into the groove 80' of the valve guide 80. In operation the open end 81 of the funnel is placed toward the air currents, caused by movement of the vehicle on which the invention is attached. The air is forced through the funnel 79, connecting pipe 82 and into the groove 80' of the valve guide. The currents of air may pass through the same type grooves, holes and apertures shown in Fig. 5.

An important advantage of the invention is that the exhaust and inlet openings which communicate with the cylinder may have a large area, with relation to the size of the cylinder, whereby power capable of being developed by the engine and the speed at which the engine is adapted to operate is relatively great. Moreover, since the valve head 26, the valve guide 25 and the stem 19 are maintained at a low temperature, the size and weight of the parts may be reduced and the engine will operate with minimum vibration. Also, the cost of the material used to form the valve stem and valve head can be considerably reduced, since cheaper material may be used. This is true because cheap valve material will give satisfactory results when utilized in a cool location, whereas a usual valve operated at excessive heat must be made from expensive material to give satisfactory results, since heat lowers the strength of metal.

Still another advantage of the invention is that currents of air containing oil cool the valve head and stem and lubricate the valve stem. Also, the piston walls and the top and walls of the cylinder, and the oil in the crank case, are maintained at a low temperature. Therefore, the exhaust valve seat is unlikely to burn, or pit, and the valve head will not warp.

Another important point is that durability of the cam shaft and other parts is increased, because, since the pressure on the valve spring is reduced, the spring may be made relatively small.

Carbon deposits on the exhaust valve guide are practically eliminated by constant currents of air. Moreover, sticking of the valve is eliminated, thereby preventing backfiring of the engine.

Still another advantage of the invention is that the exhaust valve may be adjusted so that it will remain open near or at the bottom dead center of the piston stroke, whereby the engine is adapted to develop considerable power with relation to the consumption of fuel. Also, the distance through which the valves are required to travel during their operation is relatively small, whereby the engine is adapted to operate smoothly without excessive vibration.

It is apparent that I have devised a novel and useful structure, which embodies the features of advantages enumerated, and while I have, in the present instance, shown and described preferred embodiments thereof, various changes may be made in the general form and arrangement of mechanical parts described without departing from the invention. Hence I do not limit myself to the precise details of the materials or the size and shape thereof as set forth, but consider myself at liberty to make such changes and alterations as fairly fall within the spirit and scope of the appended and final claims.

What I claim as new and desire to secure by Letters Patent is:

1. In an internal combustion engine, the combination with an engine block having a cylinder having a reciprocating piston therein adapted to make compression, explosion, exhaust and intake strokes, a crank case fixed to the bottom of said block, an engine head having a valve guide having a spiral groove therein and being fixed to the top of said block and having an exhaust passage, an operative exhaust valve in said head and slidable in said guide and having a stem, head and seat, of means to create currents of air around and in contact with said stem and in contact with said valve head and thence through said exhaust passage.

2. In an internal combustion engine, the combination with an engine block having a cylinder having a reciprocating piston therein adapted to make compression, explosion, exhaust and intake strokes, a crank case fixed to the bottom of said block, an engine head fixed to said block and having a vertical opening therein communicating with and in alignment with said cylinder, and having an exhaust passage and communicating with said opening, and having an exhaust valve seat at the lower portion of said opening, of a valve guide mounted in said engine head and having an outwardly extending flange integral therewith and having a body having a central hole therein, said central hole being the same diameter at all points, a valve stem slidable in said central hole, a valve head integral with the lower end of said stem, said flange having a groove on its lower outer edge, said guide having a groove therein extending from its top to its bottom and around said stem, said engine head having a hole therein leading from said flange groove to the outside of said head, a hole in said valve guide body and communicating with said flange groove and said central hole, means to force air through said head hole, guide flange groove and guide body groove, said stem having a reduced lower portion adapted to communicate with the lower portion of said guide body groove whereby said air is adapted to contact said valve head, means whereby when said valve head is in open position the flow of air onto said valve head is stopped and means to control the flow of air in contact with said valve head.

3. In an internal combustion engine, the combination with an engine block having a cylinder having a reciprocating piston therein adapted to make compression, explosion, exhaust and intake strokes, a crank case fixed to said block and having a breather crevice and an aperture therein, of an engine head fixed to said block and having at the top of said cylinder an exhaust valve seat and having an exhaust passage leading from said seat to the outside of said engine, an exhaust valve guide having a round central hole therein and having a screw type groove therein from its upper end to its lower end, said central round hole being the same diameter from top to bottom, said guide having a hole therein whose walls extend horizontally, said last mentioned hole communicating with the upper portion of said groove, a hole communicating with said last mentioned hole and the outside of said head, a valve stem slidably mounted in said central hole and having a reduced lower end, a valve head integral with the lower end of said valve stem, resilient means to urge said valve head in contact with said seat during the intake, compression and explosion strokes of said piston, said reduced portion of said stem being in communication with said groove when said valve head is in contact with said seat, an operative air pump connected with said engine and having an inlet and an outlet opening, a pipe having its lower end communicating with said outlet opening and having its upper end communicating with said hole leading to the outside of said engine, said pump adapted to draw air from said crank case through said breather crevice and said aperture and force currents of said air through said holes, said groove and said exhaust passage and in contact with said valve head during the intake, compression and explosion strokes of said piston, and means whereby said currents of air, in contact with said valve head, are stopped during the exhaust stroke of said piston.

4. In an internal combustion engine, the combination with an engine block having a cylinder having a reciprocating piston therein adapted to make compression, explosion, exhaust and intake strokes, a crank case fixed to the bottom of said block, an engine head fixed to said block and having a vertical opening therein communicating with and in alignment with said cylinder, and having an exhaust passage communicating with said opening, and having an exhaust valve seat at the lower portion of said opening, of a valve guide mounted in said engine head and having an outwardly extending flange integral therewith and having a body having a central hole therein, said central hole being the same diameter at all points, a valve stem slidable in said central hole, a valve head inetgral with the lower end of said stem, said flange having a groove on its lower outer edge, said guide having a groove therein extending from its top to its bottom and around said stem, said engine head having a hole therein leading from said central hole to the outside of said head, a hole in said valve guide body and communicating with said central hole, means to force air through said head hole, guide flange groove and guide body groove, said stem having a reduced lower portion adapted to communicate with the lower portion of said guide body groove whereby said air is adapted to contact said valve head.

5. In an internal combustion engine, the combination with an engine block having a cylinder having a reciprocating piston therein adapted to make compression, explosion, exhaust and intake strokes, a crank case fixed to said block and having a breather crevice and an aperture therein, of an engine head fixed to said block and having at the top of said cylinder an exhaust valve seat and having an exhaust passage leading from said seat to the outside of said engine, an exhaust valve guide having a round central hole therein and having a screw type groove therein from its upper end to its lower end, said central round hole being the same diameter from top to bottom, said guide having a hole therein whose walls extend horizontally, said last mentioned hole communicating with the upper portion of said groove, a hole communicating with said last mentioned hole and the outside of said head, a valve stem slidably mounted in said central hole and having a reduced lower end, a valve head integral with the lower end of said valve stem, resilient means to urge said valve head in contact with said seat during the intake, compression and explosion strokes of said piston, said reduced portion of said stem being in communication with said groove when said valve head is in contact with said seat, an operative air pump connected with said engine and having an inlet and an outlet opening, a pipe having its lower end communicating with said outlet opening and having its upper end communicating with said hole leading to the outside of said engine, said pump adapted to draw air from said crank case through said breather crevice and said aperture and force currents of said air through said holes, said groove and said exhaust passage and in contact with said valve head during the intake, compression and explosion strokes of said piston.

6. In an internal combustion engine, the combination with an engine block having a cylinder having a reciprocating piston therein adapted to make compression, explosion, exhaust and intake strokes, a crank case fixed to said block and having a breather crevice and an aperture therein, of an engine head fixed to said block and having at the top of said cylinder an exhaust valve seat and having an exhaust passage leading from said seat to the outside of said engine, an exhaust valve guide having a screw type groove therein from its upper end to its lower end, means to produce currents of air, communicating between said means and said groove whereby said currents of air are introduced into said groove, a valve stem slidably mounted in said guide, a valve head integral with the lower end of said valve stem, resilient means to urge said valve head in contact with said seat during the intake, compression and explosion strokes of said piston, means to permit said currents to pass through said groove and contact said valve head when said head is contacting its seat, means to remove said valve head from its seat during the exhaust stroke of said piston, and means to stop said currents of air when said valve head is removed from contact with its seat.

7. In an internal combustion engine, the combination with an engine block having a cylinder having a reciprocating piston therein adapted to make compression, explosion, exhaust and intake strokes, a crank case fixed to the bottom of said block, an engine head fixed to said block and having a vertical opening therein communicating with and in alignment with said cylinder, and having an exhaust passage communicating with said opening, and having an exhaust valve seat at the lower portion of said opening, of a valve guide mounted in said engine head and having an outwardly extending flange integral therewith and having a body having a central hole therein, a valve stem slidable in said central hole, a valve head integral with the lower end of said stem, said guide having a groove therein extending from its top to its bottom, said engine head having a hole therein leading from said central hole to the outside of said head, means to force air through said head hole, and guide body groove, said stem having a reduced lower portion adapted to communicate with the lower portion of said guide body groove whereby said air is adapted to contact said valve head, means whereby when said valve head is in open position the flow of air onto said valve head is stopped and means to control the flow of air in contact with said valve head.

8. In an internal combustion engine, the combination with an engine block having a cylinder having a reciprocating piston therein adapted to make compression, explosion, exhaust and intake strokes, a crank case fixed to said block and having a breather crevice and an aperture therein, of an engine head fixed to said block and having at the top of said cylinder an exhaust valve seat and having an exhaust passage leading from said seat to the outside of said engine, an exhaust valve guide having a screw type groove therein and having a hole therein whose walls extend horizontally, said last mentioned hole communicating with the upper portion of said groove, a hole communicating with said last mentioned hole and the outside of said head, a valve stem slidably mounted in said guide and having a reduced lower end, a valve head integral with the lower end of said valve stem, means to urge said valve head in contact with said seat during the intake, compression and explosion strokes of said piston, said reduced portion of said stem being in communication with said groove when said valve head is in contact with said seat, the beginning of said groove being below the top of said guide and the ending of said groove being above the bottom of said guide, an operative air pump connected with said engine and having an inlet and an outlet opening, a pipe having its lower end communicating with said outlet opening and having its upper end communicating with said hole leading to the outside of said engine, said pump adapted to draw air from said crank case through said breather crevice and said aperture and force currents of said air through said holes, said groove and said exhaust passage and in contact with said valve head during the intake, compression and explosion strokes of said piston, and means whereby said currents of air, in contact with said valve head, are stopped during the exhaust stroke of said piston.

9. In an internal combustion engine, the combination with an engine block having a cylinder having a reciprocating piston therein adapted to make compression, explosion, exhaust and intake strokes, a crank case fixed to the bottom of said block, an engine head fixed to said block and having a vertical opening therein communicating with and in alignment with said cylinder, and having an exhaust passage communicating with said opening, and having an exhaust valve seat at the lower portion of said opening, of a valve guide mounted in said engine head and having an outwardly extending flange integral therewith and having a body having a central hole therein, a valve stem slidable in said central hole, a valve head integral with the lower end of said stem, said guide having a groove therein extending from its top to its bottom, said engine head having a hole therein leading from said central hole to the outside of said head, means to force air through said head hole, and guide body groove, said stem having a reduced lower portion adapted to communicate with the lower portion of said guide body groove whereby said air is adapted to contact said valve head.

10. In an internal combustion engine, the combination with an engine block having a cylinder having a reciprocating piston therein adapted to make compression, explosion, exhaust and intake strokes, a crank case fixed to said block and having a breather crevice and an aperture therein, of an engine head fixed to said block and having at the top of said cylinder an exhaust valve seat and having an exhaust passage leading from said seat to the outside of said engine, an exhaust valve guide having a screw type groove therein and having a hole therein whose walls extend horizontally, said last mentioned hole communicating with the upper portion of said groove, a hole communicating with said last mentioned hole and the outside of said head, a valve stem slidably mounted in said guide and having a reduced lower end, a valve head integral with the lower end of said valve stem, means to urge said valve head in contact with said seat during the intake, compression and explosion strokes of said piston, said reduced portion of said stem being in communication with said groove when said valve head is in contact with said seat, the beginning of said groove being below the top of said guide and the ending of said groove being above the bottom of said guide, an operative air pump connected with said engine and having an inlet and an outlet opening, a pipe having its lower end communicating with said outlet opening and having its upper end communicating with said hole leading to the outside of said engine, said pump adapted to draw air from said crank case through said breather crevice and said aperture and force currents of said air through said holes, said groove and said exhaust passage and in contact with said valve head during the intake, compression and explosion strokes of said piston.

11. In an internal combustion engine, the combination with an engine block having a cylinder having a reciprocating piston therein adapted to make compression, explosion, exhaust and intake strokes, a crank case fixed to said block, of an engine head fixed to said block and having at the top of said cylinder an exhaust valve seat, an exhaust valve guide having a spiral groove therein from its upper end to its lower end, means to produce currents of air, communicating between said means and said groove whereby said currents of air are introduced into said groove, a valve stem slidably mounted in said guide, a valve head integral with said valve stem, means to urge said valve head in contact with said seat during the intake, compression and explosion strokes of said piston, and means to permit said currents to pass through said groove and contact said valve head when said head is contacting its seat.

12. In an internal combustion engine, a cylinder block, a cylinder head thereon, a piston in the cylinder of said block, said cylinder head including an exhaust passageway extending from said cylinder, a valve mounted for reciprocation in said head, said head including a seat for said valve therein, means for supplying air under compression, said head including an air passageway extended from the supply means along the valve stem to the valve head for delivering air directly against the rear side of the valve head cooling the stem and head, said valve stem provided with a formed portion coactive with the bore in which it is mounted for reciprocation for opening the passageway to the valve head when the valve is seated and closing the same when the valve is open.

13. In an internal combustion engine, a cylinder block, a cylinder head mounted thereon, a piston in the cylinder of said block, said cylinder head having an exhaust passageway extending from said cylinder, a valve slidably mounted in said head, said head including a seat for said valve therein, means for supplying air under compression, said head including an air delivery passageway extended from the supply means and emptying against the rear side of the valve head, and a valve device operative by the valve movement for opening the air delivery passageway when the valve is closed and closing the air delivery passageway when the valve is open.

14. In an internal combustion engine, a cylinder block, a cylinder head mounted thereon, a piston in the cylinder, said cylinder head having an exhaust passageway extended from said cylinder, a slide valve mounted in said head, said head including a seat for said valve therein, means for supplying air under compression, a sleeve provided in said head about the stem of said valve and extended into the exhaust passageway to a point adjacent the valve head, said sleeve including an air passageway extended from the supply means to the valve head for delivering the air against the rear side of the valve head, and a formed portion on said valve stem adapted to block the air passageway when the valve is open.

15. In an internal combustion engine, a cylinder block, a cylinder head thereon, a piston in the cylinder of said block, an exhaust passageway extending from said cylinder and including a valve seat, a slide valve operatively mounted for engagement with said seat, means for supplying air under pressure, an air delivery passageway extended from said means for delivering air under pressure to the rear side of the head of said valve, and an air flow control device located in the air delivery passageway adjacent the outlet thereof, said air flow control device operative by the valve movement for opening and closing the air delivery passageway.

16. In an internal combustion engine, a cylinder block, a cylinder head mounted on said block, a piston in said cylinder, said cylinder head having an exhaust passageway extended from said cylinder, a slide valve mounted in said head, said cylinder head including a seat for said valve therein, means for supplying air under pressure, said cylinder head including an air delivery passageway extended from the supply means and delivering an air blast against the rear side of the valve head, and a valve device located within and adjacent the discharge end of the air delivery passageway for opening the air delivery passageway when the valve is closed and closing the air delivery passageway when the valve is open.

17. In an internal combustion engine, a cylinder block, a cylinder head mounted thereon, a piston in the cylinder of said block, said cylinder head having an exhaust passageway extending from said cylinder, a valve slidably mounted in said head, said cylinder head including a seat for said valve therein, means for supplying air under pressure greater than the pressure of the exhaust passing from the cylinder into the exhaust passageway, said head including an air delivery passageway extended from the supply means and emptying against the rear side of the valve head, and a valve device operative by the valve movement for opening the air delivery passageway, when the valve is closed and closing the air delivery passageway when the valve is open.

VICTOR F. ZAHODIAKIN.